Oct. 22, 1963  M. F. RUDY  3,107,954
SPLIT BALL SPHERICAL BEARING
Filed Oct. 28, 1960
2 Sheets-Sheet 1
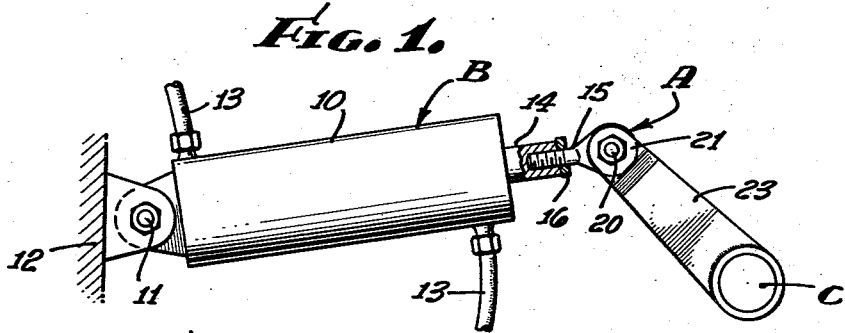
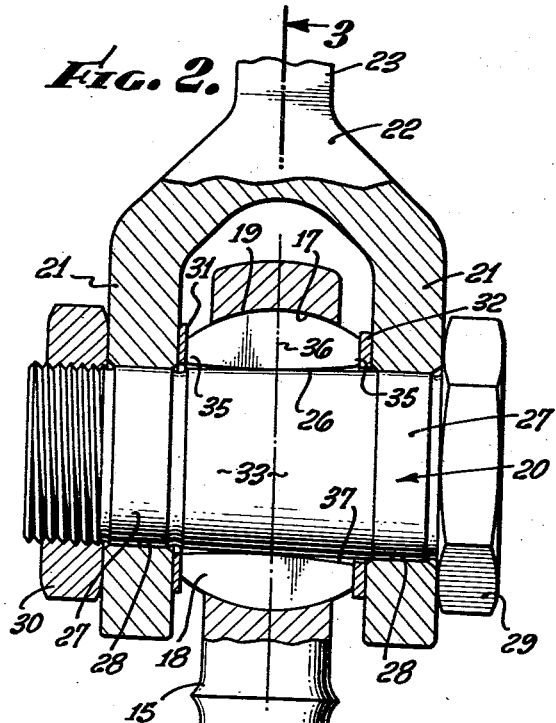
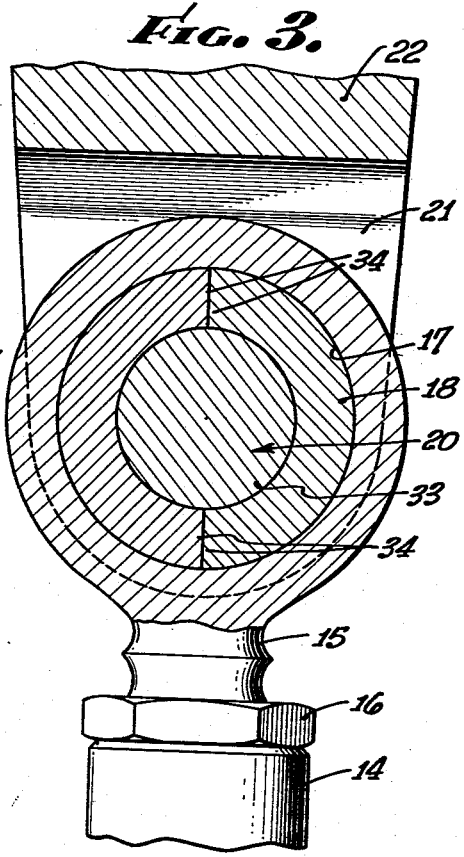
INVENTOR.
MARION F. RUDY
BY
Bernard Kriegel
ATTORNEY.

Oct. 22, 1963    M. F. RUDY    3,107,954
SPLIT BALL SPHERICAL BEARING

Filed Oct. 28, 1960

INVENTOR.
MARION F. RUDY
BY
Bernard Kiegel
ATTORNEY.

United States Patent Office 3,107,954
Patented Oct. 22, 1963

3,107,954
SPLIT BALL SPHERICAL BEARING
Marion F. Rudy, 17411 Keswick St., Northridge, Calif.
Filed Oct. 28, 1960, Ser. No. 65,619
12 Claims. (Cl. 308—72)

The present invention relates to bearings, and more particularly to bearings or joints of the spherical type.

Spherical bearings are shown in which the load is transmitted between an inner member or shaft and an outer member or housing through an intervening ball-like member having an external spherical surface bearing upon a companion internal spherical surface in the housing. As an example, in United States Patent No. 2,260,-283, a split or two-piece ball member, with an external spherical surface, is held in assembled position within a companion housing by a shaft or pin passing through the bore of the ball member.

Heretofore, spherical bearings of the type above referred to have been possessed of certain serious disadvantages. The ball member is slightly smaller in external diameter than the spherical internal diameter of the housing, the load being transmitted between the ball and housing through only a point of contact, or at best, a small area of contact, resulting in concentrated wear on the parts and their relative short life. At times, the concentration of the load on the very small area can result in failure of the parts, which would not occur with a large area of contact present for the transmission of the load. The making of the outside diameter of the ball member smaller than the inside diameter of the housing provides clearance between the parts, and unless the parts are made with close tolerances, undesirable backlash is produced.

Another disadvantage associated with the previously proposed spherical bearings is caused by the deflection of the shaft or inner member, such as a pin, under load. Such deflection causes the load to be concentrated at the outer edges of the ball member, producing their fracturing, which becomes more pronounced when the end portions of the ball member extend beyond the surrounding housing and are, therefore, unsupported. Shaft deflection also has produced bursting of the ball member due to concentration of the load being transmitted. Moreover, deflection of the shaft or pin has produced expansion of the split ball member and its undesired locking or binding in the housing.

Accordingly, it is an object of the present invention to provide a spherical bearing in which the load is transmitted between the spherical surfaces over an area of contact and along, at least, a line of contact, rather than a point of contact, thereby avoiding concentration of load and wear, and failure of the parts.

Another object of the invention is to provide a spherical bearing in which proper clearance between the spherical ball surface and companion spherical surface of the surrounding housing, to control backlash between the parts, is obtainable within a relatively wide range of manufacturing tolerances; that is, without the necessity for precise finishing of the parts.

A further object of the invention is to provide a spherical bearing in which appropriate adjustment can be made to compensate for wear of the parts for the purpose of eliminating backlash and restoring the bearing to its original operating state.

Yet another object of the invention is to provide a spherical bearing in which deflection of the shaft or pin within the ball member does not tend to jam or bind the ball member in the surrounding housing.

An additional object of the invention is to provide a spherical bearing in which deflection of the shaft or pin does not result in concentration of the load at the edges of the ball member, but, instead, distributes the load along the length of the ball member.

Still a further object of the invention is to provide a spherical bearing in which shaft or pin deflection within the ball member does not introduce bursting forces on the ball member that tend to effect its disruption.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a side elevational view of an application of the invention, parts being shown in section;

FIG. 2 is a longitudinal section, with parts in side elevation, of the bearing portion of the apparatus illustrated in FIG. 1;

FIG. 3 is a cross section taken along the line 3—3 on FIG. 2;

Figure 4:
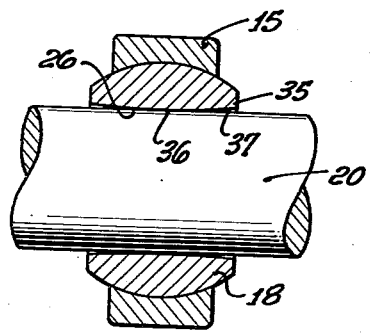
FIG. 4 is a somewhat diagrammatic view of the bearing under a substantially no-load condition.

As disclosed in FIG. 1, a spherical bearing apparatus A is employed to transmit motion between a hydraulic device B and a crankshaft C. The hydraulic device includes a cylinder 10 mounted on a suitable pivot 11 carried by a support 12. Fluid pressure entering through lines 13 at opposite ends of the cylinder can move a piston therein (not shown), connected to a piston rod 14, either in one direction or the other, there being a suitable rod housing 15 threadedly secured to the end of the piston rod 14 and locked in position by a lock nut 16. This rod housing 15 has an internal spherical surface 17 in which a ball member 18 is mounted having a companion external surface 19. A shaft or clevis pin 20 passes through the ball member 18, being mounted within spaced arms 21 of a clevis or yoke 22 forming the outer end of a crank arm 23 suitably affixed to the crankshaft C. It is evident that the motion of the piston and piston rod 14 is transmitted through the bearing A to the crank arm 23, the spherical surfaces 17, 19 permitting appropriate adjustment or alignment between the parts.

It is to be understood that the foregoing application of the bearing A is for illustrative purposes, and that the bearing can be used wherever some universality of motion between relatively movable members is desirable.

Figure 8:
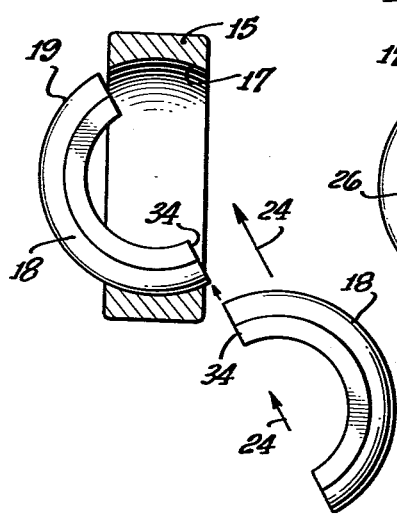
FIG. 8 is a longitudinal section through the outer housing and a side elevational view of a split ball bearing member being assembled, illustrating steps in mounting the ball bearing member in the housing.
Figure 9:
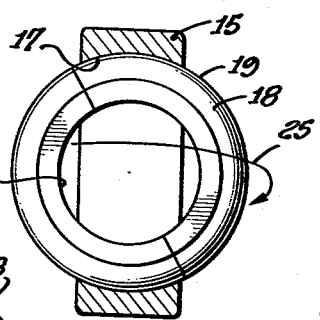
FIG. 9 is a view similar to FIG. 8 illustrating another step in the mounting of the ball bearing member in the housing.
Figure 10:
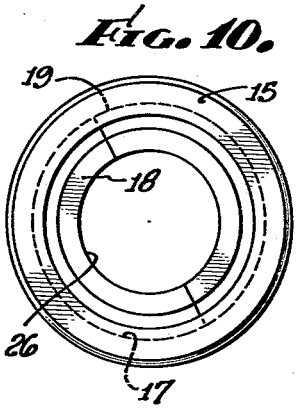
FIG. 10 is a side elevational view of the ball bearing member fully mounted within its surrounding housing.

As specifically illustrated, the ball member 18 is of the split type, being made of two halves and having an external great circle diameter substantially equal to the internal diameter of the spherical surface 17 in the housing or outer member 15. Actually, the external diameter of the ball member 18 is slightly less than that of the internal diameter of the housing to provide for working clearance between the parts. The ball member 18 is mounted in the housing in the manner illustrated in FIGS. 8, 9 and 10. First, one half of the ball member 18 is moved into the housing at right angles to the plane of the housing, as shown in FIG. 8. The other half of the ball member 18 is then moved, in the direction of the arrows 24, into the housing 15 and against its spherical surface 17 diametrically opposite the spherical surface engaged by the previously installed ball member half, the parts then occupying the position illustrated in FIG. 9 and lying in a plane substantially at right angles to the central plane of the housing. The two bearing halves are then turned as a unit, as in a direction indicated by the curved arrow 25 in FIG. 9, through an angle of 90 degrees to swing them within the housing 15, as shown in FIG. 10. When the shaft or clevis pin 20 in inserted through the central bore 26 of the ball member, the two pieces of the latter are prevented from coming out of the housing, being appropriately maintained in place in bearing relation to the spherical surface 17 of the housing 15.

As illustrated most clearly in FIG. 2, the central bores through the ball member is tapered to a slight extent in one direction, as from the right end of the ball member to the left end of the ball member, as disclosed in FIG. 2, the central portion 33 of the pin also being tapered. The pin has cylindrical portions 27 on opposite sides of its taper 33 fitting snugly within companion aligned bores 28 in the arms 21 of the clevis, there being a head 29 at one end of the pin bearing against one arm 21, and a nut 30 threadedly mounted on the other end of the clevis pin or shaft 20 and bearing against the exterior of the other arm 21, for the purpose of holding the parts in appropriate assembly.

The ball member 18 can be appropriately adjusted lengthwise of the pin 20 by a suitable selection of washers or shims 31, 32 at opposite ends of the ball member 18, and between it and the arms 21 of the clevis or yoke 22. As disclosed in FIG. 2, under a no-load or very light load condition, the pin 20 is snugly engaged with the inner wall of the bore 26 through the ball member 18, and due to its taper, has expanded the two halves of the split ball member outwardly until the spherical surface 19 of the ball halves or segments snugly engages the companion internal spherical surface 17 of the housing 15, but without binding thereagainst.

The tapered shaft or clevis pin 33 functions as a wedge and can actually deflect the ball segments 18, 18 to increase their effective external diameter, whereby such diameter can conform more closely to the internal diameter of the spherical surface 17 of the surrounding housing 15. Thus, it is evident that the taper 33 (exaggerated in FIG. 2), which need only be slight as, for example, between about one degree to about four degrees, with a corresponding taper to the bore 26 of the housing 15, results in expanding of the ball segments 18, 18 in a direction perpendicular to the plane of the ball split into contact with the spherical internal surface 17 of the housing. The tapered pin or shaft portion 33 also engages the ends 34 of the segments and elastically expands the segments uniformly in a plane perpendicular to the shaft 20 and passing through the center of the split ball 18, until the outer spherical surface 19 of the ball segments, whose diameter has now been increased slightly, is in no-load mating contact with the internal spherical surface 17 of the housing, thus eliminating all backlash in the bearing, inasmuch as there is no lost motion between the exterior of the ball segments 18 and the spherical inner wall of the housing, as well as there being no lost motion between the tapered pin or shaft 20 and the inner wall of the tapered bore 26 through the ball segments.

By virtue of the use of the tapered pin or shaft 20, 33, the outside diameter of the ball member exactly matches the internal diameter of the spherical housing wall 17. Accordingly, there is no point contact between the ball member 18 and housing 15, as in prior devices, but, instead, there is at least a full circumferential line contact between the ball member and the housing, thereby distributing the load being transmitted fully around the spherical bearing engaging parts.

In the event that wear occurs between the parts, the bearing can be adjusted to compensate for such wear, and thereby eliminate backlash. As shown in FIG. 2, the bearing can be disassembled and a thicker washer or shim 31 can be placed at the left end of the ball member, and a thinner washer or shim 32 at the right end of the ball member, so that the inner wall 26 of the latter is then contacting a greater diameter portion of the tapered pin or shaft 33, which will effect an additional expansion of the ball segments 18, 18 until their spherical outside diameter again exactly matches the spherical internal diameter of the housing 15. Additional adjustments can occur, when needed, until the ball segments 18 are expanded elastically beyond their ultimate tensile strength.

Instead of the bore 26 through the segmentally split ball member 18 being tapered with a straight wall that conforms to the straight taper 33 on the pin or shaft, the bore 26 of the ball is bellmouthed to eliminate serious loading of its edges 35 as the result of deflection of the shaft or pin 20, as explained hereinbelow. Thus, the bore 26 flares outwardly, as from its central plane 36 at right angles to its axis, along a longitudinal curve 37 in both directions from such central plane, the extent of flaring or bellmouthing being exaggerated in the drawings. The specific curvature is determined by a combination of tests and empirically. The shaft or pin 20 contacts the ball segments 18 at their central portion, such as disclosed in FIG. 2, to effect expansion of the ball segments into snug engagement with the internal spherical surface 26 of the surrounding housing 15, as explained above.

Figure 6:
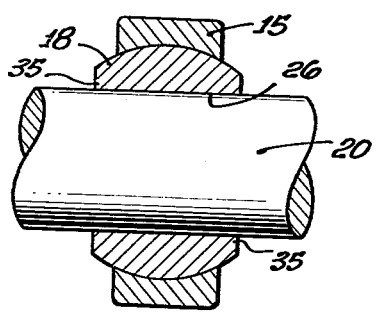
FIG. 6 is a view corresponding to FIG. 4 of a prior form of bearing with its shaft or clevis pin under a substantially no-load condition.
Figure 7:
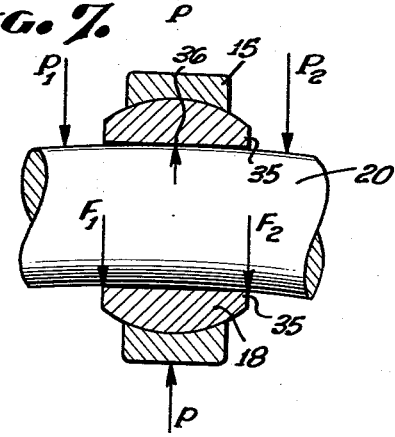
FIG. 7 is a view similar to FIG. 6 illustrating the shaft under a heavy load and in an exaggerated deflected condition.

The desirability of bellmouthing the bore 26 of the ball can be understood by reference of FIGS. 6 and 7, in which the bore through the ball member has not been bellmouthed. As disclosed in FIG. 6, the shaft 20 is under a no-load condition and makes a close precision fit within the straight bore 26 through the ball member. In FIG. 7, the shaft has been subjected to load and deflects, the deflection being exaggerated in this figure for purpose of illustration. It is evident from FIG. 7 that the bearing load is not uniform across the length of the ball 18, but is severely concentrated at the extreme edges 35 of the ball. Thus, the forces $F_1$ and $F_2$ are concentrated at the extreme edges 35 of the ball. The intermediate and opposite force F is acting at the central portion 36 of the ball and is exerting a bursting effort on the latter. In other words, the deflected shaft or pin 20, in concentrating the application of forces at the spaced points $F_1$ and $F_2$, and at the opposed intermediate point F, tends to increase the diameter of the ball member 18 and effect its bursting. It also concentrates the forces $F_1$ and $F_2$ on the edges 35 of the ball member, tending to fracture this member at such edge portions. Fracture will occur inasmuch as the ball member 18 is ordinarily made of a comparatively hard, brittle, and wear resisting material. In addition, the edges 35 of the ball member will cut into the shaft or clevis pin 20 and induce fatigue failure at such points.

With respect to fracturing of the ball member at the edges $F_1$ and $F_2$, the tendency to destroy the parts is increased when the ball member 18 overhangs the surrounding housing 15, which is usually the case, such edge portions of the ball member being unsupported.

In view of the tendency of the edge loading forces $F_1$ and $F_2$ and the opposed central force F to expand the ball member segments 18, 18, the latter will be locked against the spherical internal surface 17 of the housing, and prevent relative movement between the ball member and the housing 15, which is necessary to operation of the bearing as a self-aligning device. The result will be failure of the equipment.

By virtue of the bellmouthing or outward flaring 37 of the ball member 18 in the present case, serious edge loading at the points $F_1$ and $F_2$ and the intermediate diametrically opposed reacting force F tending to expand and burst the ball segments 18 are eliminated. Inasmuch as the load to which the shaft or clevis pin 20 will be subjected is ordinarily known, the extent of its deflection is also known. Accordingly, the curvature or bellmouthing 37 of the inner wall of the ball member bore 26 can be predetermined and appropriately provided in the ball member.

Figure 5:
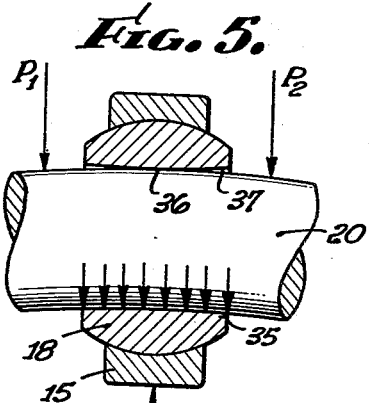
FIG. 5 is a view similar to FIG. 4 illustrating the shaft or clevis pin of the bearing deflected under comparatively heavy load, the extent of deflection being exaggerated for purposes of illustration.

The operation of applicant's device to eliminate the aforenoted serious disadvantages of the arrangement, diagrammatically depicted in FIGS. 6 and 7, is illustrated in FIGS. 4 and 5. Although a straight cylindrical shaft or clevis pin 20 is disclosed for illustrative purposes, the same principle would apply in the event the shaft or pin is slightly tapered and the bore 26 of the ball member is correspondingly slightly tapered. As shown in FIG. 4, the bearing is under substantially no load. The central portion 36 of the ball member is contacting the shaft or pin 20. However, there is a progressively greater clearance space between the wall of the ball member bore 26 and the shaft or pin in directions away from the point of contact to the outer ends 35 of the ball member 18.

The subjecting of the shaft or pin 20 to load, and deflection of the shaft, is illustrated in exaggerated fashion in FIG. 5. Thus, the application of the load at the spaced points $P_1$ and $P_2$ results in deflection of the shaft. However, the shaft will merely be bent to conform to the curvature 37 of the wall of the ball member bore 26, the load being distributed substantially uniformly along the length of the ball member 18, rather than being concentrated at its edge portions 35. In view of the bellmouthing of the outer portions of the ball member, there is no contact of the shaft or pin 20 with the outer ends of the ball member, which result in a diametrically opposite reactive force against the central portion 36 of the ball member, tending to effect its expansion. The diametrically opposite portion (corresponding to F in FIG. 7) of the shaft or pin will still remain in contact with the ball member 18 without tending to expand it, in view of the fact that separation between the diametrically opposed portions of the ball member is not produced by deflection of the shaft or clevis pin.

Accordingly, it is evident that there are no load concentrations at the edge portions 35 of the ball member that will cause their breakdown. In view of the fact bellmouthing of the bore, with the outer ends 35 preferably even curved so that no sharp edges are present, eliminates cutting into the shaft or clevis pin 20, to induce fatigue failure in the latter. Moreover, there is no binding tendency on the ball segments 18, tending to spread them apart inordinately and producing their seizure against the spherical internal surface 17 of the encompassing housing or outer member 15. The ball member 18 always remains free to shift smoothly and without backlash relative to the encompassing housing 15, the bearing A always being capable of functioning as a self-aligning bearing.

I claim:

1. In a spherical bearing: an outer member having an internal spherical surface; a split ball member having a bore and an external spherical surface companion to and engaging said internal spherical surface, the normal diameter of said ball member spherical surface being less than the diameter of said internal spherical surface; a tapered inner member in said bore; means for forcibly moving said inner member relatively longitudinally of said ball member into wedging engagement therewith to elastically expand said ball member to a condition wherein the external diameter of its spherical surface matches the diameter of said internal spherical surface; and means retaining said inner member in wedging engagement with said ball member to hold said ball member in said elastically expanded condition.

2. In a spherical bearing: an outer member having an internal spherical surface; a split ball member having a bore and an external spherical surface companion to and engaging said internal spherical surface, the normal diameter of said ball member spherical surface being less than the diameter of said internal spherical surface; inner means in said bore in engagement with said ball member, said means comprising longitudinally adjustable wedge means for elastically expanding said ball member to a condition wherein the external diameter of its spherical surface matches the diameter of said internal spherical surface; and means retaining said wedge means in position to hold said ball member in said elastically expanded condition.

3. In a spherical bearing: an outer member having an internal spherical surface; a split ball member having a bore and an external spherical surface companion to and engaging said internal spherical surface; an inner member in said bore in engagement with said ball member longitudinally inwardly of an end portion of said ball member, and the bore of said ball member curving from within the confines of said outer member with an increasing diameter longitudinally from the location of engagement of said inner member with said ball member to said end portion, the curvature of said bore being such as to prevent deflection of said inner member from spreading said ball member and binding said ball member in said outer member.

4. In a spherical bearing: an outer member having an internal spherical surface; a split ball member having a bore and an external spherical surface companion to and engaging said internal spherical surface; an inner member in said bore in engagement with said ball member intermediate its ends, and the bore of said ball member curving in opposite directions from within the confines of said outer member with an increasing diameter longitudinally from said intermediate location of engagement of said inner member with said ball member to each of the ends of said ball member, the curvature of said bore being such as to prevent deflection of said inner member from spreading said ball member and binding said ball member in said outer member.

5. In a spherical bearing: an outer member having an internal spherical surface; a split ball member having a bore and an external spherical surface companion to and engaging said internal spherical surface; and a tapered inner member in said bore and movable relatively longitudinally of said ball member into wedging engagement therewith to expand said ball member against said internal spherical surface, said tapered member engaging said ball member longitudinally inwardly of an end portion of said ball member, the bore of said ball member curving with an increasing diameter longitudinally from the location of engagement of said tapered member with said ball member to said end portion.

6. In a spherical bearing: an outer member having an internal spherical surface; a split ball member having a bore and an external spherical surface companion to and engaging said internal spherical surface; and a tapered inner member in said bore and movable relatively longitudinally of said ball member into wedging engagement therewith to expand said ball member against said internal spherical surface; said tapered member engaging said ball member intermediate its ends, the bore of said ball member curving in opposite direction with an increasing diameter longitudinally from said intermediate location of engagement of said tapered member with said ball member to each of the ends of said ball member.

7. In a spherical bearing: an outer member having an internal spherical surface; a split ball member having a bore and an external spherical surface companion to and engaging said internal spherical surface; and inner means in said bore in engagement with said ball member, said means comprising longitudinally adjustable wedge means for expanding said ball member against said internal spherical surface; said inner means engaging said ball member longitudinally inwardly of an end portion of said ball member; the bore of said ball member curving with an increasing diameter longitudinally from the location of engagement of said inner means with said ball member to said end portion.

8. In a spherical bearing: an outer member having an internal spherical surface; a split ball member having a bore and an external spherical surface companion to and engaging said internal spherical surface; and inner means in said bore in engagement with said ball member, said means comprising longitudinally adjustable wedge means for expanding said ball member against said internal spherical surface; said inner means engaging said ball member intermediate its ends, the bore of the ball member curving in opposite directions with an increasing diameter longitudinally from said intermediate location of engagement of said inner means with said ball member to each of the ends of said ball member.

9. In a spherical bearing: an outer member having an internal spherical surface; a split ball member having a bore and an external spherical surface companion to and engaging said internal spherical surface; a tapered inner member in said bore and movable relatively longitudinally of said ball member into wedging engagement therewith to expand said ball member against said internal spherical surface, said tapered member engaging said bal member longitudinally inwardly of an end portion of said ball member, the bore of said ball member curving with an increasing diameter longitudinally from the location of engagement of said tapered member with said ball member to said end portion; and means for adjusting the longitudinal position of said tapered member with respect to said ball member and for retaining said tapered member in said adjusted position.

10. In a spherical bearing: an outer member having an internal spherical surface; a split ball member having a bore and an external spherical surface companion to and engaging said internal spherical surface; inner means in said bore in engagement with said ball member, said means comprising longitudinally adjustable wedge means for expanding said ball member against said internal spherical surface; said inner means engaging said ball member longitudinally inwardly of an end portion of said ball member, the bore of said ball member curving with an increasing diameter longitudinally from the location of engagement of said inner means with said ball member to said end portion; and means for determining the longitudinal position of said wedge means to control the extent of expansion of said ball member.

11. In a spherical bearing: an outer member having an internal surface; a split ball member having a bore and an external spherical surface companion to and engaging said internal spherical surface, the normal diameter of said ball member spherical surface being less than the diameter of said internal spherical surface; a tapered inner member in said bore in engagement with said ball member intermediate its ends; means for forcibly moving said inner member relatively longitudinally of said ball member into wedging engagement therewith to elastically expand said ball member to a condition wherein the external diameter of its spherical surface matches the diameter of said internal spherical surface; means retaining said inner member in wedging engagement with said ball member to hold said ball member in said elastically expanded condition; the bore of said ball member curving in opposite directions with an increasing diameter longitudinally from said intermediate location of engagement of said inner member with said ball member to each of the ends of said ball member.

12. In a spherical bearing: an outer member having an internal spherical surface; a split ball member having a bore and an external spherical surface companion to and engaging said internal spherical surface, the normal diameter of said ball member spherical surface being less than the diameter of said internal spherical surface; inner means in said bore in engagement with said ball member, said means comprising longitudinally adjustable wedge means for elastically expanding said ball member to a condition wherein the external diameter of its spherical surface matches the diameter of said internal spherical surface; means retaining said wedge means in position to hold said ball member in said elastically expanded condition; said inner means engaging said ball member intermediate its ends; the bore of the ball member curving in opposite directions with an increasing diameter longitudinally from said intermediate location of engagement of said inner means with said ball member to each of the ends of said ball member.

References Cited in the file of this patent

UNITED STATES PATENTS

| | | |
|---|---|---|
| 2,260,283 | Halford et al. | Oct. 28, 1941 |
| 2,401,814 | Burhans | June 11, 1946 |

FOREIGN PATENTS

| | | |
|---|---|---|
| 107,213 | Austria | Sept. 10, 1927 |
| 553,067 | Great Britain | May 6, 1943 |
| 751,618 | Germany | Dec. 22, 1952 |
| 791,555 | Great Britain | Mar. 5, 1958 |